United States Patent [19]
Raj et al.

[11] Patent Number: 5,490,425
[45] Date of Patent: Feb. 13, 1996

[54] FERROFLUID PRESSURE SENSOR AND WARNING DEVICE

[75] Inventors: Kuldip Raj, Merrimac, N.H.; James Torres, Methuen, Mass.; Susan Lanphear, Nashua, N.H.

[73] Assignee: Ferrofluidics Corporation, Nashua, N.H.

[21] Appl. No.: 212,272

[22] Filed: Mar. 14, 1994

[51] Int. Cl.⁶ ..................................................... G01L 9/00
[52] U.S. Cl. ................................................................ 73/745
[58] Field of Search .............................. 73/705, 744, 745

[56]       References Cited
        U.S. PATENT DOCUMENTS

| | | | |
|---|---|---|---|
| 4,703,174 | 10/1987 | Anderson et al. | 73/745 |
| 4,726,223 | 2/1988 | Huang | 73/745 |
| 4,788,867 | 12/1988 | Kishel | 73/706 |
| 5,317,948 | 6/1994 | Blaha | 73/745 |
| 5,365,791 | 11/1994 | Padula et al. | 73/745 |

OTHER PUBLICATIONS

Key et al., "Magnetic Fluid Seal System For Control Of Pump Fugitive Emissions," *Proceedings Of The Tenth International Pump Users Symposium.*

Primary Examiner—Richard Chilcot
Assistant Examiner—Elizabeth L. Dougherty
Attorney, Agent, or Firm—Bookstein & Kudirka

[57]  ABSTRACT

Mechanically simple, reliable devices for measuring pressure or detecting pressures above a certain limit are disclosed. A representative device includes a magnet surrounded by one or more bands of a ferrofluid, and which is free to move within a nonmagnetic, generally elongated housing. In operation, the housing is oriented vertically, and the lower aperture exposed to the region of pressure to be sensed. The opposite end, which preferably contains another aperture, is exposed to a reference pressure (ordinarily the atmosphere) that remains isolated from the region of pressure to be sensed. Gravity draws the magnet downward, toward the bottom of the housing, while pressure at the lower aperture tends to force the magnet upward. When the force exerted by the pressure source exceeds the downward force of gravity, the magnet travels upward through the housing; this movement may be detected by an appropriate sensing arrangement, and is used to provide a warning signal or a quantitative pressure measurement.

12 Claims, 4 Drawing Sheets

FERROFLUID PRESSURE SENSOR AND WARNING DEVICE

FIELD OF THE INVENTION

The present invention relates to measurement of pressure and the generation of warning signals in response thereto, and in particular to a ferrofluid-based device that generates measurement and/or warning signals based on movement of a magnetic element.

DESCRIPTION OF THE RELATED ART

In many industrial processing and manufacturing environments, constant monitoring of pressure at potential failure points is essential to prevent catastrophic failure or release of contaminants into the environment. For example, in petroleum refineries, large quantities of volatile, toxic organic fluids are pumped through numerous distillation columns and collection tanks. The pumps contain multiple-stage seals that prevent escape of bulk liquid and volatile components. Concurrent or cumulative failure of these seals, which operate under large pressures and therefore experience significant stress, can result in substantial outflow of harmful liquid and gaseous materials into the refinery —— presenting the danger of toxicity to personnel, fire or even explosion —— and into the surrounding ground and atmosphere. Accordingly, the pressures across seals are continuously checked to detect early signs of wear that can be ameliorated, thereby preventing sudden seal failure.

Devices for measuring pressure frequently employ diaphragms, strain gauges, fluid columns and the like, and therefore tend to be relatively expensive and complex. Furthermore, typical devices must be supplied constantly with electricity in order to operate. This requirement may well be inconsistent with the device's function, since conditions capable of causing sudden pressure increases may interrupt electrical power as well.

DESCRIPTION OF THE INVENTION

Brief Summary of the Invention

The present invention provides a mechanically simple, reliable device for measuring pressure or detecting pressures above a certain limit. The design is amenable to implementations that do not require continuous sources of power, and may be straightforwardly adapted for a wide variety of usages.

Briefly, the invention comprises a magnet surrounded by one or more bands of a ferrofluid, and which is free to move within a nonmagnetic elongated housing. The ferrofluid band or bands are retained against the magnet by its own magnetic field, and serve as essentially frictionless bearings along the inner wall of the housing. An aperture lies at one, and preferably at both ends of the housing.

In operation, the housing is oriented vertically, and the lower aperture exposed to the region of pressure to be sensed. The opposite end, which preferably contains another aperture, is opened to a reference pressure (ordinarily the atmosphere) that remains isolated from the region of pressure to be sensed. Gravity draws the magnet downward, toward the bottom of the housing, while pressure at the lower aperture tends to force the magnet upward. When the force exerted by the pressure source exceeds the downward force of gravity, the magnet travels upward, unimpeded, through the housing; this movement may be detected by an appropriate sensing arrangement, and is used to provide a warning signal or a quantitative pressure measurement.

In the simplest application, the invention merely reports that the sensed pressure exceeds a predetermined minimum. This implementation requires only a single sensor disposed along the housing and capable of detecting movement of the magnet from its rest position. In more sophisticated applications, two or more sensors disposed along the housing sense the rate at which the magnet accelerates upward; this value specifies the force exerted by the pressure source, which can be used to calculate its pressure.

In one particularly preferred application, the invention is incorporated into a ferrofluid seal. These are commonly used devices that provide hermetic seals against gas and other contaminants in applications involving rotary shafts. For example, ferrofluidic seals have been utilized in computer magnetic disc storage units as a barrier between the motor area and the disc area, and as back-up seals on mechanical pumps utilized in petroleum refineries. By utilizing the invention to detect the buildup of pressure between ferrofluid sealing members, their incipient failure can be detected at an early stage and repair readily effected.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
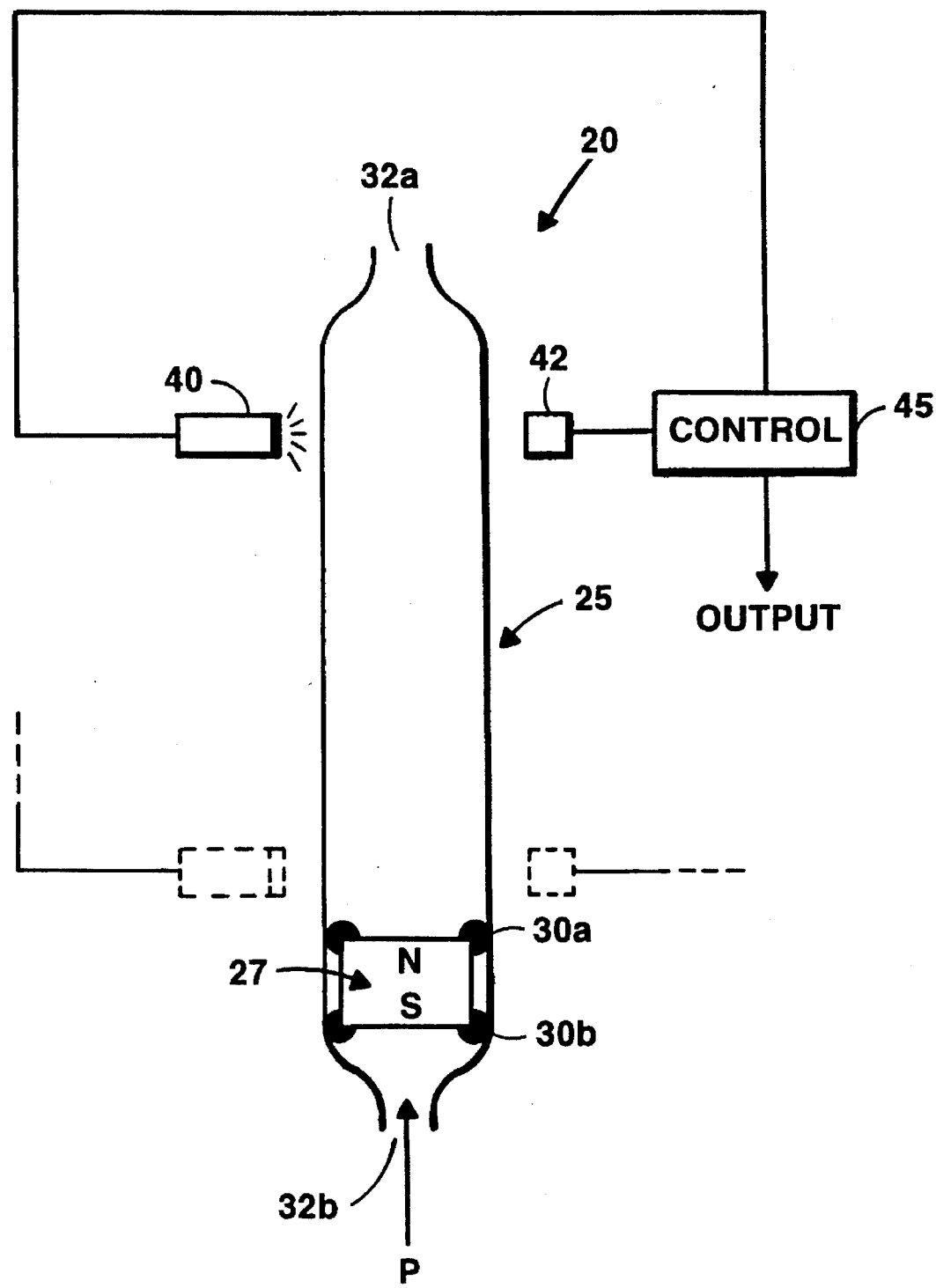
FIG. 1 is a sectional view of a representative embodiment of the invention, shown in conjunction with an optoelectronic detector.

Refer first to FIG. 1, which illustrates the components of the first embodiment of the invention, indicated generally by reference numeral 20. The pressure sensor 20 includes a hollow, nonmagnetic housing 25, which surrounds a permanent magnet 27 whose transverse dimensions substantially match the interior conformation of housing 25, but which are slightly (preferably on the order of several thousandths of an inch) smaller; magnet 27 is therefore free to move axially within housing 25. Housing 25 may be fabricated from any structurally stable material that does not exhibit significant responsiveness to an applied magnetic field; plastic, glass, aluminum and nonmagnetic steel represent suitable materials.

Magnet 27 may be axially or radially polarized. If axially polarized, as shown in FIG. 1, it is surrounded at each of its poles (indicated in the figure by N and S designations) by a thin, discrete band of ferrofluid 30*a*, 30*b*. The ferrofluid may be an ester, fluorocarbon, synthetic-hydrocarbon, silahydrocarbon or silicon formulation; in particular, we have obtained worthwhile results using the TPG11 product marketed by Ferrofluidics Corp., Nashua, N.H., which has a magnetization of 400 Gauss and a viscosity of 20–25 centipoises, in conjunction with a cylindrical Alnico 5 magnet approximately 8 mm in length and 3 mm in diameter, and a magnetic flux of 1600 Gauss at the faces of the magnet. The characteristics of the ferrofluid and magnet 27 are related. If the magnet has a relatively low magnetic field, it is necessary to use a ferrofluid of relatively high magnetization in order to achieve the necessary levitation (as described below). The flux of magnet 27 can range, for example, from 500–4000 Gauss, and the magnetization of the ferrofluid from 50–400 Gauss. Bands 30a, 30b are concentrated at the poles of magnet 27, and each need occupy no more than 30% of its axial length.

Alternatively, if magnet 27 is radially polarized, it is surrounded by a ferrofluid band that extends over its entire outer contour. For purposes of discussion, an axially polarized magnet with multiple discrete ferrofluid bands is assumed, it being understood that similarly advantageous results may be achieved with a radially polarized magnet surrounded by a single ferrofluid band.

Ferrofluid bands 30a, 30b make contact with the inner wall of housing 25, suspending magnet 27 therein and also forming a seal. The contact between magnet 27 and the inner wall of housing 25 is completely frictionless when magnet 27 is at rest, and nearly so during movement. Magnet 27 therefore slides freely within housing 25 (with ferrofluid bands 30a, 30b functioning as bearings fixedly retained against magnet 27 by its magnetic field). Furthermore, the sealing function performed by the ferrofluid bands effectively isolates the portion of housing 25 below magnet 27 from that above the magnet.

In the illustrated embodiment, an aperture 32a, 32b is located at each end of housing 25. In operation, the device 20 ordinarily spans a seal separating a source of pressure (of magnitude P) to be sensed and the atmosphere (or other source of reference pressure), with aperture 32b exposed to the pressure source and aperture 32a vented to the reference pressure. When the upward force $F_p$ exerted on magnet 27 by the pressure source (i.e., the pressure P multiplied by the cross-sectional area of magnet 27) exceeds the downward force of gravity $F_g$ acting on magnet 27, the magnet will move upward with an acceleration determined by the difference in forces $F_p-F_g$. Thus, the greater the difference in forces, the faster magnet 27 will travel upward within housing 25.

Figure 2:
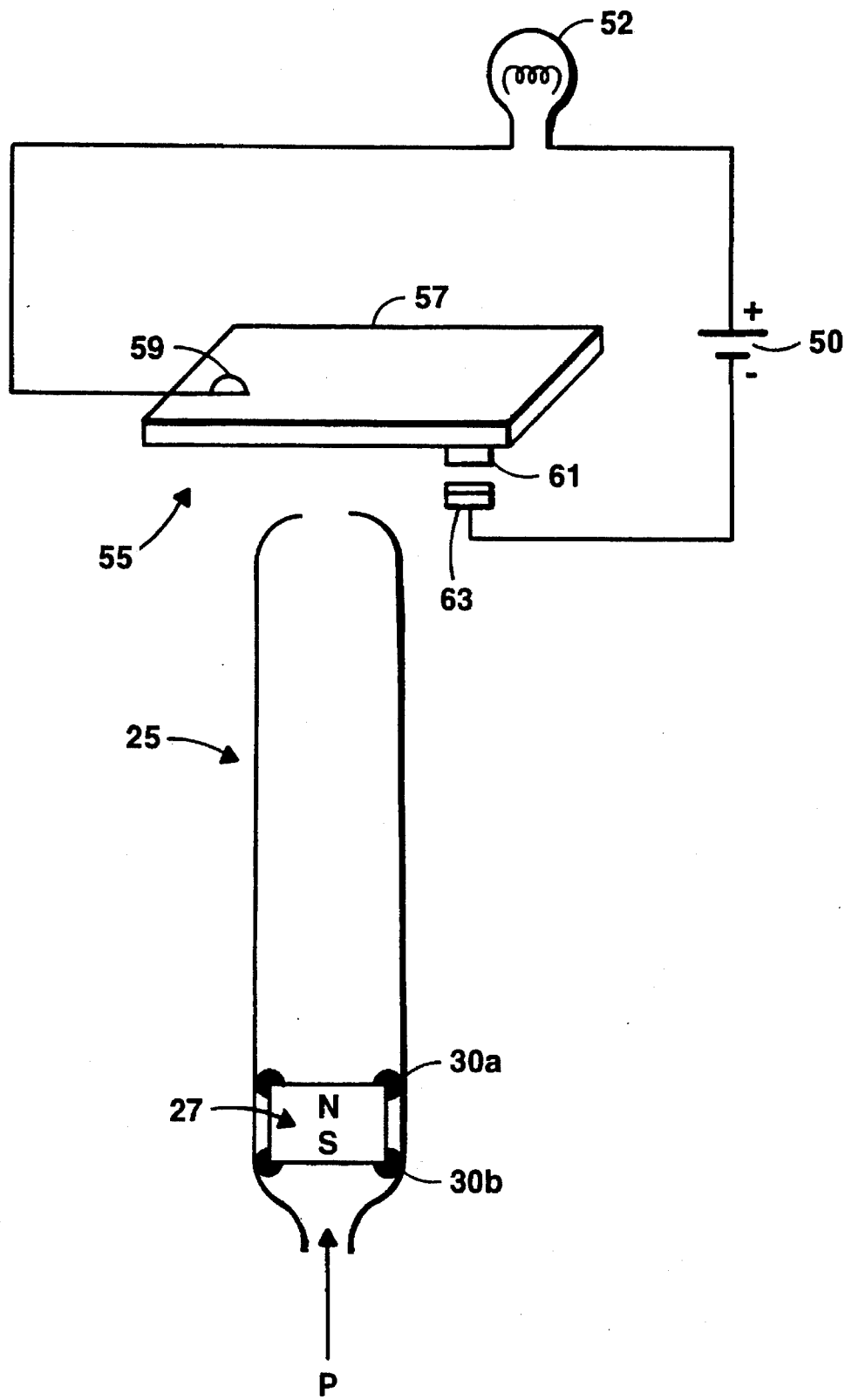
FIG. 2 is a sectional view of a representative embodiment of the invention, shown in conjunction with a relay detection assembly, with the magnetic element in a rest position.
Figure 3:
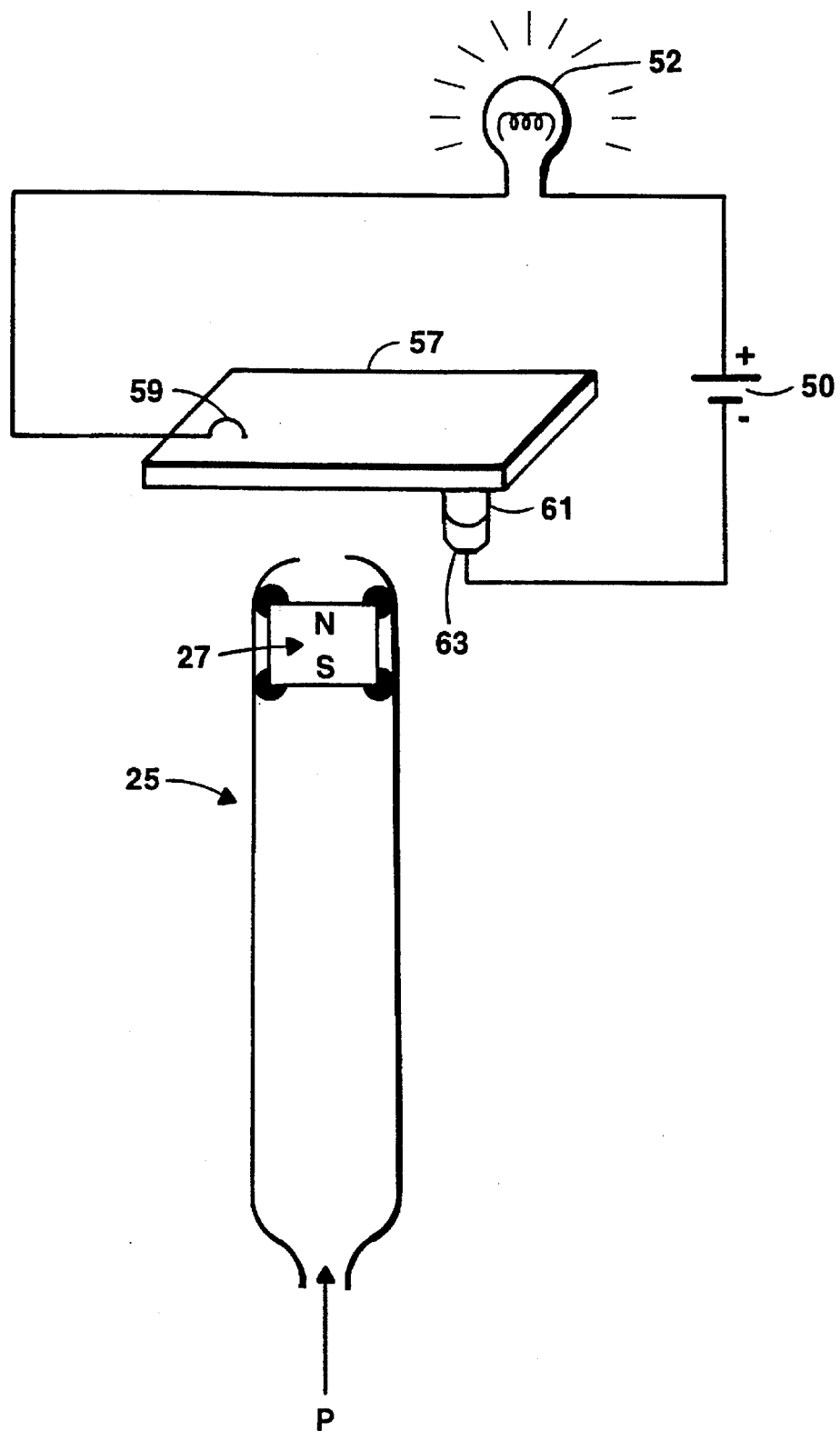
FIG. 3 illustrates the embodiment shown in FIG. 2, but with the magnet disturbed from its rest position and proximate to the relay.

In its simplest application, illustrated in FIGS. 1–3, the invention is used as a warning device to detect pressures above a predetermined minimum. The user defines this minimum pressure through judicious selection of the mass (which determines $F_g$) and the cross-sectional area of magnet 27 (which determines $F_p$ for a target pressure P), given knowledge of the reference pressure. When the pressure P exceeds the minimum, magnet 27 travels upward in housing 25 and interacts with a suitable sensing device that generates a signal indicating the proximity of the magnet. A number of sensing devices can be employed for this purpose. FIG. 1 illustrates use of an optoelectronic sensor arrangement comprising a light source (e.g., a light-emitting diode) 40 and a light sensor (e.g., a photo-diode) 42. In operation, light emanating from light source 40 passes through housing 25 and is detected by light sensor 42, producing an electrical signal. When magnet 27 reaches the sensor, it interrupts the light and therefore the electrical signal, the absence of which is detected by a conventional control circuit 45 that generates a warning output in response.

An alternative arrangement, which exploits the magnetic field of magnet 27 rather than its opacity, is shown in FIGS. 2 and 3. In this arrangement the proximity of magnet 27 to the top of housing 25 is detected by a relay circuit. The circuit includes a power source 50, a warning device (e.g., a lamp) 52, and a relay 55. In the illustrated embodiment, relay 55 includes a conductive armature 57 that is attracted by a magnetic field, and which pivots about a hinge 59. Armature 57 contains an electrical contact 61, which mates with a complementary electrical contact 63 connected to power source 50.

FIG. 3 illustrates operation of the relay embodiment. When magnet 27 reaches the top of housing 27, it attracts armature 57, closing the contacts and completing the circuit. Warning device 52 receives current and is thereby activated; it remains activated since no force draws magnet 27 away from the illustrated position. Depending on the particular application, it may prove advantageous to locate the relay 55 along the side of housing 25 rather than at its top. This embodiment offers a number of practical advantages, including low cost, the absence of power dissipation prior to detection, and, using a battery, or other self-contained power source, the ability to avoid reliance on outside sources of power prone to failure.

Other suitable sensing devices include Hall elements or inductors; the latter can comprise a wire coil wound directly around housing 25 at a position somewhere above the magnet rest position, and which is connected to circuitry capable of detecting the presence of magnet 27 within the coil windings by virtue of the induced voltage or the change in the coil's impedance. It should be noted that the sensing element need not be positioned at or near the top of housing 25, since any movement of magnet 27 from its rest position indicates that $F_p > F_g$ (with the degree of movement being irrelevant to this determination). Thus, for example, the sensor illustrated in FIG. 1 can be placed at the rest position of magnet 27 and its operation reversed, so that departure of magnet 27 from its rest position results in detection of light from light source 40 and the consequent generation of an optoelectronic signal, which may be amplified into a warning signal.

The existence of an aperture 32a at the top of housing 25 is not necessary to operation of the invention. While such an unvented configuration will result in backpressure (from the trapped volume of air) that slows the progress of magnet 27, precludes maintenance of a uniform reference pressure and prevents magnet 27 from traversing the full vertical extent of housing 25, the backpressure is not severe for small vertical excursions of magnet 27; accordingly, by utilizing a sensing configuration that detects the departure of magnet 27 from its rest position rather than its traverse of a higher vertical position, it is possible to maintain accurate operation against a reference pressure that is effectively fixed for the small excursion necessary for detection.

In a more sophisticated application the present invention can be used to measure the actual magnitude of the pressure P, rather than merely warning that a specific minimum value has been exceeded. In this case a pair of sensing devices (optoelectronic sensors, as shown in FIG. 1 by the depicted and phantom arrangements; relays; Hall elements; or coils) are placed at different axial positions along housing 25. The time it takes magnet 27 to pass the two sensors is indicative of its rate of travel, and, therefore, its acceleration through housing 25; the acceleration, in turn, reflects the net force $F_N=F_p-F_g$ acting on the magnet 27, which may be used to compute the pressure P. More specifically, with magnet 27 initially at rest, the acceleration a through a distance s between sensors is given by the relation $s=at^2/2$, where t is the time it takes for magnet 27 to travel the distance s; it is straightforward, therefore, to calculate a from the known quantity s and the observed quantity t. Since $F_N=ma$, where m is the known mass of magnet 27, $F_N$ is easily derived as well. The pressure P, finally, is computed according to the relation $P=(F_N+F_g)/A$, where A is the cross-sectional area of magnet 27.

Figure 4:
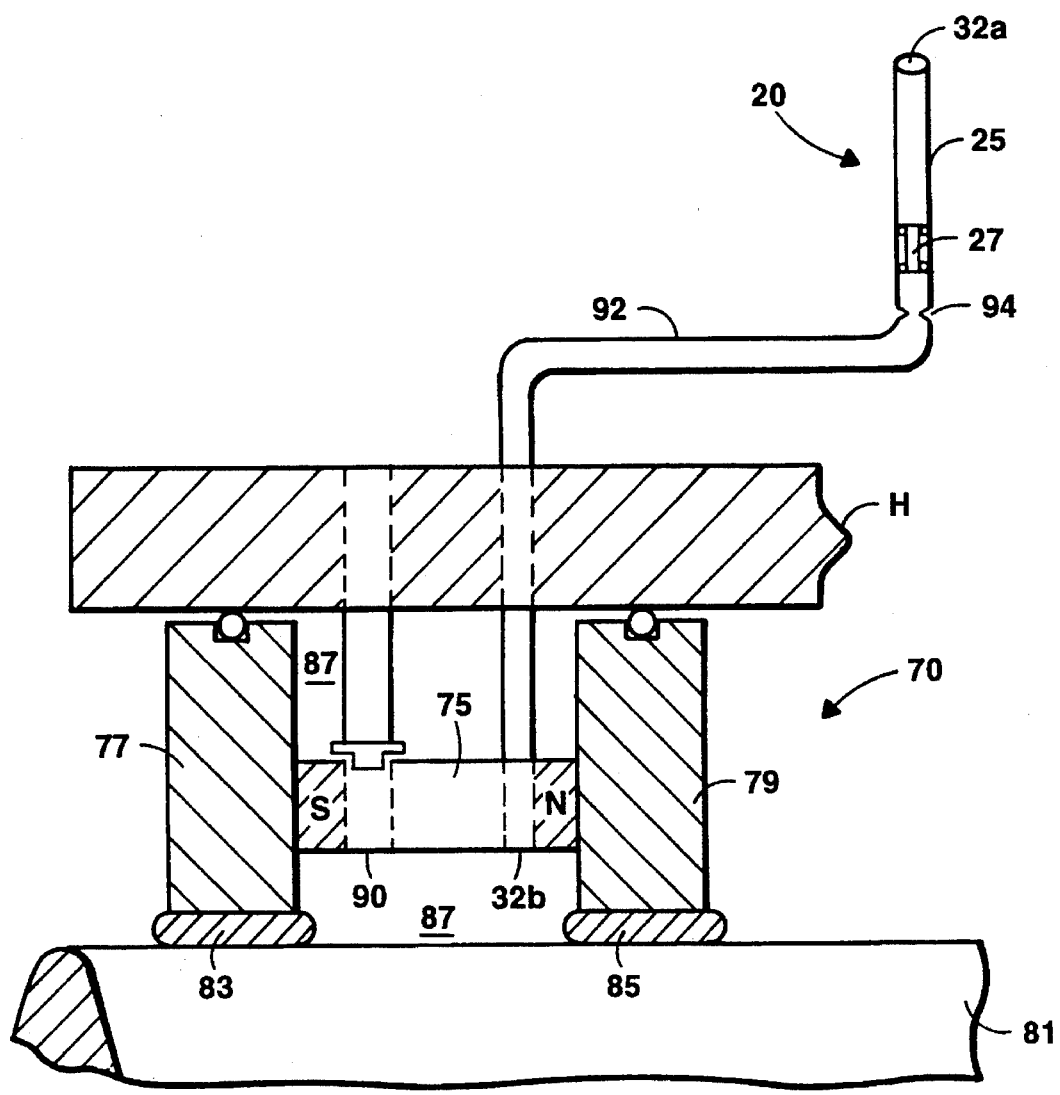
FIG. 4 is a sectional view of the present invention incorporated within a two-stage exclusion seal.

The sensor of the present invention is especially suited to monitoring exclusion seal assemblies for signs of impending failure. A representative application involves incorporation of the invention into a ferrofluid seal, as illustrated in FIG. 4. The depicted two-stage seal assembly 70 includes a disk or cylindrical magnet 75 and a pair of associated cylindrical, magnetically permeable pole pieces 77 and 79, all of which surround a magnetically permeable shaft 81 in rotating relationship therewith. Pole pieces 77 and 79 are arranged, when the seal 70 is placed around shaft 81, such that a small clearance or gap (typically within the range of 0.002 to 0.020 inch) exists radially between the surface of shaft 81 and the adjacent faces of pole pieces 77 and 79. A ferrofluid 83, 85 is introduced into these gaps, filling them to form liquid O-ring seals and thereby furnishing the double barrier that prevents gas or other contaminants from travelling axially along shaft 81. In other words, in order to escape seal 70, airborne material originating along the shaft on the left side of the seal must first penetrate peripheral ferrofluid O-ring 83, traverse the annular recess 87 formed by pole pieces 77 and 79 (and partially occupied by magnet 75), and thereafter penetrate the second peripheral ferrofluid O-ring 85. The other ends of pole pieces 77 and 79 seal against a stationary, housing H by means of, for example, a pair of conventional O-rings.

Ferrofluid O-rings 83 and 85 are retained in the associated gaps by the magnetic circuit created by the magnet, the pole pieces and the shaft. Specifically, the magnetic field created by magnet 75 follows a flux path extending through pole pieces 77 and 79, across the gaps and through shaft 81. This path ensures firm retention of ferrofluid O-rings 83 and 85 within the gaps. Means may also be provided for charging the seals with ferrofluid when they degrade. Indicated at reference numeral 90 is a capped fill port through which replacement ferrofluid may be introduced in accordance with copending application Ser. No. 07/936,858, co-owned with the present application and hereby incorporated by reference.

One telltale sign of the need to replace or augment the ferrofluid O-rings is the buildup of pressure in recess 87. Excessive vapor pressure against one of the ferrofluid O-rings (e.g., as a result of leakage from an upstream mechanical seal) stresses that O-ring beyond its retention capability, resulting in leakage of the vapor into recess 87. If this condition is not corrected promptly, vapor pressure will build up within recess 87 and ultimately cause failure of the second ferrofluid O-ring.

We therefore incorporate a ferrofluid pressure sensor 20 in accordance with the present invention within the seal 70. In particular, an inlet tube 92 leading to the sensor 20 spans the annular extents of housing H and magnet 75, with lower aperture 32b in fluid communication with recess 87. The operative portion of sensor 20, including magnet 27 and aperture 32a (which is preferably vented to the atmosphere), remains vertically disposed at a location outside housing H. The junction of inlet tube 92 and sensor housing 25 preferably features a crimp or constriction 94, which retains magnet 27 inside housing 25.

With this arrangement, the buildup of pressure within recess 87 triggers sensor 20 when it reaches a predetermined limit. Sensor 20 alerts appropriate personnel to the need for introduction of additional ferrofluid into the seal or complete replacement of the seal. Alternatively, sensor 20 can be coupled to suitable control circuit that automatically dispenses the needed amount of ferrofluid through inlet 90.

Without appropriate isolation measures, the magnetic field of seal magnet 75 will interact with that of magnet 27, preventing movement of magnet 27 from being affected exclusively by pressure at aperture 32b. The resulting interference with pressure measurement is most conveniently minimized by configuring sensor 20 so as to locate magnet 27 at a relatively large distance front magnet 75, ensuring that their magnetic fields do not interact to an appreciable extent. Even without such an ameliorative measure, it is possible simply to choose the mass and cross-sectional area of magnet 27 with the force exerted by magnet 75 in mind, in effect calibrating the characteristics of sensor 20 for proper operation in the particular environment.

This type of arrangement is suitable for use in conjunction with a wide variety of ferrofluid seals, which may include, for example, multiple magnets, pole pieces and ferrofluid O-rings arranged in various configurations.

It will therefore be seen that we have developed a versatile and economical pressure-sensing system that may be used to perform a wide variety of measurement and warning tasks. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A ferrofluid pressure sensor comprising:
    a. a nonmagnetic housing having an interior dimension, all interior wall and two ends;
    b. means forming an aperture in at least one end of the housing;
    c. a solid magnet having a longitudinal axis and disposed within the housing, the magnet having a transverse dimension smaller than the interior dimension of the housing;
    d. at least one band of ferrofluid surrounding the magnet and in contact with the interior wall of the housing; and
    e. means for sensing displacement of the magnet from a rest position.

2. The pressure sensor of claim 1 wherein the displacement-sensing means is at least one optoelectronic sensor.

3. The pressure sensor of claim 1 wherein the displacement-sensing means is at least one Hall element.

4. The pressure sensor of claim 1 wherein the displacement-sensing means is at least one inductor.

5. The pressure sensor of claim 1 wherein the displacement-sensing means is at least one relay.

6. The pressure sensor of claim 1 wherein the displacement-sensing means is located at an end of the housing.

7. The pressure sensor of claim 1 wherein the displacement-sensing means comprises a plurality of sensors at different positions along the housing, each sensor being triggered by proximity of the magnet, and further comprising means for measuring elapsed time between triggering of each sensor and generating therefrom a pressure measurement.

8. The pressure sensor of claim 1 comprising means forming an aperture at both ends of the housing.

9. The pressure sensor of claim 1 wherein the magnet is axially polarized and comprising a thin, discrete band of ferrofluid surrounding the magnet at each pole.

10. A ferrofluid pressure sensor for use in conjunction with a multiple-stage ferrofluid exclusion seal having a plurality of sealing members and forming a hermetic cavity between sealing members, the pressure sensor comprising:

a. a nonmagnetic housing having an interior dimension, an interior wall and two ends, at least one of which is in fluid communication with the hermetic cavity;

b. means forming an aperture in at least the end of the housing in fluid communication with the hermetic cavity;

c. a solid magnet having a longitudinal axis and disposed within the housing, the magnet having a transverse dimension smaller than the interior dimension of the housing;

d. at least one band of ferrofluid surrounding the magnet and in contact with the interior wall of the housing; and e. means for sensing displacement of the magnet from the end of the housing in fluid communication with the hermetic cavity.

11. The sensor of claim 10 wherein the seal is a ferrofluid exclusion seal comprising:

a. a seal magnet surrounding a magnetically permeable core member having an outer diameter, the seal magnet having an inner diameter larger than the outer diameter of the core;

b. at least two magnetically permeable pole pieces in magnetic communication with and sandwiching the seal magnet, the pole pieces extending from the seal magnet to a position close to the core member to form gaps between the pole pieces and the core member and a cavity between the seal magnet and the core member; and c. a ferrofluid filling the gaps to form seals.

12. The sensor of claim 11 further comprising at least one channel extending through the seal magnet to allow ferrofluid to be introduced into the cavity, whereby ferrofluid so introduced is drawn into the gaps.

* * * * *